United States Patent [19]

Hickner et al.

[11] Patent Number: 4,507,412

[45] Date of Patent: Mar. 26, 1985

[54] HIGH SOLIDS COATINGS FROM ADDUCTS OF POLYEPOXIDES WITH POLYAMINES AND BLOCKED POLYISOCYANATES

[75] Inventors: Richard A. Hickner; Michael B. Cavitt, both of Lake Jackson, Tex.

[73] Assignee: The Dow Chemical Company, Midland, Mich.

[21] Appl. No.: 628,546

[22] Filed: Jul. 6, 1984

Related U.S. Application Data

[63] Continuation-in-part of Ser. No. 479,533, Mar. 28, 1983.

[51] Int. Cl.³ .............................................. C08L 63/00
[52] U.S. Cl. .................................. 523/454; 523/455; 523/456; 525/528; 528/45
[58] Field of Search ............... 525/528; 523/454, 455, 523/456

[56] References Cited

U.S. PATENT DOCUMENTS

| | | | |
|---|---|---|---|
| 3,922,253 | 11/1975 | Jerabek et al. | 525/528 |
| 4,134,865 | 1/1979 | Tominaga | 525/528 |
| 4,134,866 | 1/1979 | Tominaga et al. | 525/528 |
| 4,296,010 | 10/1981 | Tominaga | 525/528 |

FOREIGN PATENT DOCUMENTS 55-86850  7/1980  Japan .................................. 525/528

*Primary Examiner*—John C. Bleutge
*Assistant Examiner*—Robert E. L. Sellers, II
*Attorney, Agent, or Firm*—J. G. Carter

[57] ABSTRACT

High solids coatings are prepared from (1) adducts of a polyepoxide and a polyamine and (2) a polyisocyanate blocked with a ketoxime or lactam.

38 Claims, No Drawings

HIGH SOLIDS COATINGS FROM ADDUCTS OF POLYEPOXIDES WITH POLYAMINES AND BLOCKED POLYISOCYANATES

CROSS-REFERENCE TO RELATED APPLICATION

This application is a continuation-in-part of co-pending application Ser. No. 479,533 filed Mar. 28, 1983.

BACKGROUND OF THE INVENTION

The present invention concerns coatings prepared from adducts of polyepoxides with polyamines and blocked polyisocyanates.

German No. 1,086,372 describes varnishes resistant to chemicals and solvents prepared from a polyamide (the reaction production of a dimer acid and a polyamine) and a trimethylolpropane/toluene diisocyanate prepolymer blocked with a phenol. Cure will take place at room temperature. Addition of an epoxy resin to the above blend results in improved adhesion (German No. 1,090,803). Flexibility of epoxy resins cured with polyamines at room temperature can be improved by conducting the cure in the presence of a TMP/TDI prepolymer capped with nonylphenol (Ger. Offen. DE No. 2,152,606).

In U.S. Pat. No. 3,321,548 resinous coatings with a fairly high degree of crosslinking and rigidity are obtained by reacting a phenol-blocked isocyanate with functionality of at least three with an amine terminated epoxy resin derived from an epoxy resin and an aromatic amine. Phenol-capped isocyanates are not acceptable in the present invention because they react with the amine-capped epoxy at room temperature and, therefore, do not have sufficient stability to formulate a one-package system.

U.S. Pat. No. 3,886,228 provides compositions from a polyamine terminated imide and an isocyanate or phenol blocked prepolymer. Again, these are room temperature curing and unacceptable as single-package systems.

Amine terminated polyamide systems stable at room temperature are provided by blocking the isocyanate prepolymer with an alcohol. These systems are cured above 350° F. (177° C.) (U.S. Pat. No. 2,995,531). Mixtures crosslinkable at elevated temperatures are obtained from a trimethylolpropane/toluene diisocyanate prepolymer capped with ε-caprolactam and cured with 3,3'-dimethyl 4,4'diaminodicyclohexyl methane (Ger. Offen. DE No. 2,131,299).

Chain extended, substantially linear elastomers prepared from a diamine and a ketoxime blocked diisocyanate are described in Canadian No. 788,481.

Electrodepositable compositions are described in U.S. Pat. Nos. 4,104,147 and 4,115,226. These are based on intermediate molecular weight amine terminated epoxies cured with blocked isocyanates, but these must be used in aqueous dispersions to provide suitable application viscosity. Amine terminated epoxies capped with an anhydride to give anodic electrodepositable coatings which may be cured with a blocked isocyanate are described in U.S. Pat. No. 4,176,221.

Automotive primer-surfacers are typically cured at 275°–325° F. (135°–163° C.). To be useful, such coatings must cure sufficiently within 15 minutes (900 s) at 275° F. (135° C.) to give suitable properties. Such a coating must pass a number of tests, one of the most important being a chip resistance test described in Society of Automotive Engineers (SAE) Test Method J400. A chip rating of 6–7 is generally acceptable by the automotive companies. Recent environmental pressures have required that newer coatings have a lower volatile content.

The present invention provides coating compositions with higher solids, i.e. non-volatiles content, which are capable of curing within about 15 minutes (900 s) at 275° F. (135° C.) and provide suitable chip resistance.

SUMMARY OF THE INVENTION

One aspect of the present invention is directed to a composition curable at temperatures above about 120° C. which comprise (A) an adduct of
  (1) an epoxy resin having an average of more than one epoxy group per molecule and an average epoxide equivalent weight of from about 140 to about 1000 and
  (2) a polyamine compound having at least two amine groups selected from primary amine groups, secondary amine groups or mixture of such groups per molecule; and (B)
  (1) a material containing an average of more than one NCO group per molecule which NCO groups have been blocked with
  (2) ketoximes, aldoximes, lactams, N-hydroxy-imides or alcohols;

and wherein (a) components (A-1) and (A-2) are employed in quantities which provide from about 0.9 to about 20, preferably from about 0.9 to about 10, most preferably from about 0.9 to about 2 moles of polyamine compound per epoxide equivalent;

(b) components (A) and (B) are employed in quantities which provide a ratio of latent NCO groups in component (B) per primary and/or secondary amine group in component (A) of from about 0.75:1 to about 2.0:1, preferably from about 0.9:1 to about 1.5:1.

If desired, the excess polyamine can be removed prior to reacting the polyamine-epoxy resin adduct with the blocked isocyanate.

A latent NCO group is defined as that which has been rendered inactive, but upon heating will provide a reactive NCO group. The capped isocyanates contain latent NCO groups.

Another aspect of the present invention is a high solids coating composition comprising at least 90, preferably from about 40 to about 85 percent by weight of the aforedescribed curable composition and less than about 60, preferably from about 10 to about 50 percent by weight of a suitable solvent.

DETAILED DESCRIPTION OF THE INVENTION

Suitable epoxy resins which can be employed herein include the glycidyl ethers of aliphatic, cycloaliphatic and aromatic polyhydric materials.

Particularly suitable are the glycidyl ethers of polyhydric phenols, polyhydric bisphenols and polyhydric alcohols such as, for example, the glycidyl ethers of resorcinol, catechol, hydroquinone, bisphenol A, glycidyl ethers of aliphatic polyols such as 1,4-butane-diol, dipropylene glycol, tripropylene glycol, a polypropylene glycol of 400 molecular weight, dibutylene glycol, tributylene glycol, an adduct of bisphenol A with four moles of ethylene or propylene oxide or glycidyl ethers of cycloaliphatic polyols such as 1,4-cyclpohexanedimethanol, bis(hydroxymethylcyclohexyl)methane, hydrogenated bisphenol A or mixtures thereof and the like.

Also suitable as epoxy resins for use herein are the elastomer or rubber modified epoxy resins in which a carboxyl-containing elastomer or rubber is reacted with an epoxy resin in such proportions that the resultant product is terminated by epoxy groups. The reaction between the epoxy resin and the carboxyl-containing rubber can be catalyzed if desired by a suitable catalyst such as triphenyl phosphine. Suitable carboxyl-containing rubber materials include, for example, carboxyl-terminated polybutadiene-acrylonitrile polymers such as those produced by B. F. Goodrich and sold under the trademark Hycar CTBN.

These and other elastomer or rubber modified epoxy resins which can be employed herein include, those disclosed in PRODUCT BROCHURE-RLP-2-"Tough Epoxy Resins with Hycar Reactive Liquid Polymers", March 1980 by B. F. Goodrich Chemical Group, by J. A. Clarke in U.S. Pat. No. 3,509,230 and by R. R. Shelley, Jr. and J. A. Clarke in U.S. Pat. No. 3,947,522 which are incorporated herein by reference.

Suitable amine materials which can be employed herein to prepare the amine terminated adducts with the epoxy resins include aliphatic amines, cyclic aliphatic amines and heterocyclic saturated amines.

Particularly suitable amine materials include, for example, aminoethyl piperazine, ethylenediamine, diethylenetriamine, trimethylenediamine, tetramethylenediamine, pentamethylenediamine, hexamethylenediamine, trimethyl hexamethylenediamine, 1,4-bis(aminoethyl)cyclohexane, 1,4-bis(aminocyclohexyl)methane, isophorone diamine, mixtures thereof and the like.

Also suitable as the amine component herein are the polyamides which are the reaction products of dimer and trimer fatty acids with an aliphatic diamine or triamine such as, for example, ethylenediamine or diethylenetriamine.

The ratio of the amine component to the epoxy may vary over a wide range. The moles of amine to equivalents of epoxy can vary from about 0.9 to 20 moles of amine to equivalents of epoxy. At the lower ratio of amine to epoxy some molecular weight build-up will occur. At the higher ratio of amine to epoxy molecular weight build-up will be minimized, however, large quantities of unreacted amine will be present. Although the excess amine may be removed, for example by distillation, it is preferable to use a lower ratio of amine to epoxy. A ratio of about 2 moles of polyamine per equivalent of epoxy will provide minimum molecular weight build-up while minimizing the amount of unreacted amine.

Suitable polyisocyanates which can be employed herein include aliphatic, cycloaliphatic or aromatic polyisocyanates which have an average of more than one —NCO group per molecule.

Particularly suitable polyisocyanates include, for example, toluene diisocyanate, methylenediphenyl diisocyanate, isophorone diisocyanate, methylene bis-(cyclohexylmethylisocyanate), hexamethylene diisocyanate, trimethyl hexamethylene diisocyanate, mixtures thereof and the like.

Also suitable as polyisocyanates are the isocyanate prepolymers prepared from the aforementioned polyisocyanates and a polyhydric material such as, for example, aliphatic diols, polyoxyalkylene diols, aliphatic triols and polyoxyalkylene triols. Particularly suitable polyhydric materials which can be employed to prepare the prepolymers include, for example, polyalkylene diols such as polypropylene or polybutylene glycols having a molecular weight from about 200 to 2000, polyesters such as, for example, poly(propylene glycol) adipate, polycaprolactonediols or triols, mixtures thereof and the like.

Suitable ketoximes which can be employed herein as the capping or blocking agent for the polyisocyanate include, for example, acetone ketoxime, methyl ethyl ketoxime, cyclohexanoneoxime, mixtures thereof and the like.

Suitable aldoximes which can be employed herein to prepare the capped or blocked polyisocyanate include, for example, acetaldoxime, propiionaldoxime, mixtures thereof and the like.

Suitable N-hydroxyimides include N-hydroxysuccinimide, N-hydroxymaleimide, N-hydroxyphthalimide, mixtures thereof and the like.

Suitable alcohols which can be employed as the capping or blocking agent for the polyisocyanates include, for example, sec-butanol, 2-ethyl hexanol, t-butanol, mixtures thereof and the like.

Suitable lactams which can be employed as the capping or blocking agent for the polyisocyanates include, for example, $\epsilon$-caprolactam, 2-pyrrolidine, mixtures thereof and the like.

When it is desired for the capped or blocked polyisocyanate to be deblocked at temperatures of from about 250°–325° F. (120°–163° C.) it is preferred to employ an aldoxime, ketoxime or lactam as the capping or blocking agent. When it is desired for the blocked polyisocyanates to become deblocked at higher temperatures, it is preferred to employ an alcohol as the blocking or capping agent.

Suitable solvents which can be employed herein include, for example, glycol ethers, ketones, esters, aromatic hydrocarbons, mixtures thereof and the like.

The curable compositions of the present invention can be employed as automotive primer surfacers, coil coatings, exterior coatings for beverage cans.

If desired, one or more additives such as, fillers, pigments, dyes, flow control agents and the like can be added to the curable and/or coating compositions of the present invention.

The following examples are illustrative of the present invention but are not to be construed as to limiting the scope thereof in any manner.

EXAMPLE 1

Preparation of Amine-capped Epoxy Resin

A 500 ml flask was charged with 31.76 g (0.25 mole) of 2-aminoethylpiperazine and 25 g of 2-methoxypropanol. A solution of 100 g (0.22 equiv.) of a diglycidyl ether of bisphenol A having an average epoxide equivalent weight (EEW) of about 450 in 100 g of 2-methoxypropanol was added during ninety minutes (5400 s) while maintaining the temperature at 30° C. The solution was stirred an additional 4.5 hours (16200 s) at room temperature. The product was a pale yellow liquid having a Gardner viscosity of Y-(approximately 1600 cps) at 51% solids at room temperature.

EXAMPLE 2

The method of Example 1 was repeated using the following epoxy resins and amines. The quantities used and properties are summarized in Table I. In runs D, E and F, a 250 ml flask was employed instead of a 500 ml flask.

TABLE I

| | | | | Amine/Epoxy Adducts | | | | | |
|---|---|---|---|---|---|---|---|---|---|
| | Epoxy Resin Solution | | | | Amine Solution | | | | |
| Run No. | Epoxy Resin | equiv. | g | g Solvent[e] | Amine | Moles | g | g Solvent[f] | Viscosity | Final Solids |
| A | A[a] | 0.84 | 200 | 133 | AEP[c] | 0.92 | 119.2 | 79.0 | Z-Z-1 (~2500 cps) | 60% |
| B | A | 0.84 | 200 | 133 | DETA[d] | 0.92 | 95.2 | 63.5 | Z-2 (~3600 cps) | 60% |
| C | B[b] | 0.44 | 200 | 133 | DETA | 0.49 | 50.4 | 33.6 | N.D.[h] | 60% |
| D | C[g] | 0.70 | 128.9 | 54 | DETA | 0.77 | 80.1 | 36.0 | N.D. | 70% |
| E | C | 0.30 | 55.9 | 54 | DETA | 1.49 | 154.2 | 36.0 | N.D. | 70% |
| F | C | 0.17 | 31.95 | 54 | DETA | 1.72 | 177.9 | 36.0 | N.D. | 70% |

[a]Epoxy Resin A was a diglycidyl ether of bisphenol A having an average EEW of about 238.
[b]Epoxy Resin B was a diglycidyl ether of bisphenol A having an average EEW of about 450.
[c]AEP = 2-aminoethylpiperazine.
[d]DETA = diethylenetriamine.
[e]The solvent employed was 2-methoxypropanol.
[f]The solvent employed was 2-methoxypropanol.
[g]Epoxy Resin C was a diglycidyl ether of bispenol A having an average EEW of about 186.
[h]N.D. = not determined.

EXAMPLE 3

Capping TDI/TMP Adduct with Methyl Ethyl Ketoxime

A 500 ml flask was charged with 336 g (1.0 equiv.) of an adduct of trimethylolpropane (TMP) and an 80/20 mixture of 2,4-/2,6-toluene diisocyanate (TDI) commercially available from Spencer-Kellog as P49-75S (75% solids in ethyl acetate). Methyl ethyl ketoxime (87.1 g, 1.0 mole, 1.0 equiv.) was added dropwise during 40 minutes (2400 s) while applying cooling as required to keep the temperature below 60° C. Forty g of methyl ethyl ketone were added, and stirring was continued an additional 90 minutes (5400 s). An additional 80 g of methyl ethyl ketone and 20 g of 2-methoxypropanol were added, giving a final product at 60.2% solids and containing 14.9% ethyl acetate, 21.3% methyl ethyl ketone and 3.6% 2-methoxypropanol. This product had a latent NCO equivalent weight of 563 and a Garnder viscosity of X. Latent NCO equivalent weight means the weight which would provide one NCO equivalent upon removal of the blocking agent.

EXAMPLE 4

Preparation of P425/TDI Prepolymer Capped with Methyl Ethyl Ketoxime

A one-liter flask was charged with 174 g (2.0 equiv.) of TDI. The contents were heated to 50° C. and 205 g (1.0 equiv.) of a polypropylene glycol of about 425 molecular weight commercially available from The Dow Chemical Company as P425 containing 0.87 g of dibutyltin dilaurate (20% solids in methyl ether ketone) was added during 30 minutes (1800 s) while maintaining the temperature below 70° C. with occasional cooling. Fifty ml of methyl ethyl ketone were added, stirring continued for an additional 40 minutes (2400 s) at 55° C. Heating was discontinued and 87.1 g of methyl ethyl ketoxime (1.0 mole, 1.0 equiv.) were added while applying cooling to keep the temperature below 55° C. An additional 25 ml of methyl ethyl ketone and 25 g of 2-methoxypropanol were added to give a total of 100 g of solvent added or 82.3% solids. The product had a latent NCO equivalent weight of 566 and a Garnder viscosity of Z.

The product gradually crystallized on prolonged standing but could be liquified by heating to about 40°-60° C.

EXAMPLE 5

Preparation of Coating from Adduct of a Glycidyl Ether of Bisphenol A Having an Average EEW of About 450 and Aminoethylpiperazine The amine adduct was prepared as in Example 1. The epoxy resin/aminoethylpiperazine adduct (11.3 g/0.02 equiv.) was mixed with 5.3 g (0.02 equiv.) of an aliphatic/aromatic, ketoxime blocked polyisocyanate commercially available from Mobay Chemical Co. as Mondur HCB (Sample A) and a like amount was also mixed with 3.1 g (0.02 equiv.) of a 2-ethylhexanol capped prepolymer with 0.29 g (2 wt.%) of dibutyltin dilaurate catalyst (Sample B). The prepolymer in Sample B was prepared by reacting 0.2 equiv. of a polypropylene glycol having an average molecular weight of about 400 and 0.8 equiv. of 2-ethylhexanol with 1.0 equiv. of 80/20 2,4-/2,6-toluene diisocyanate mixture. Films of the above two samples were drawn down on Bonderite 40 treated steel panes using a #22 wire wound rod and cured at 350° F. (177° C.) for 15 minutes (900 s). Evaluation of the films gave the following results:

| | Sample A | Sample B |
|---|---|---|
| MEK* Double Rubs | >100 | >100 |
| Reverse Impact (in-lbs) | 50 | >160 |
| (J) | 5.65 | >18.08 |
| Conical Mandrel Bend | Pass ⅛" (0.3175 cm) | Pass ⅛" (0.3175 cm) |

*MEK = methyl ethyl ketone

EXAMPLE 6

Cure of Methyl Ethyl Ketoxime Blocked Prepolymers of Examples 3 and 4

Solutions 1-4 used the blocked isocyanate of Example 3, while 5-8 used the prepolymer of Example 4. Equivalent amounts of the amine terminated epoxies and blocked isocyanates were mixed, and films were drawn down on Bonderite 40 panels with a #22 wire wound rod. Panels were baked for 30 minutes (1800 s) at 275° or 325° F. (135° or 163° C.).

Solutions 9-11 used the blocked isocyanate prepared in Example 4. Coatings were prepared as above except that the Panels were cured at 300° F. (149° C.) for 15 minutes (900 s).

The methyl ethyl ketone double rubs and reverse impact are summarized in Table II.

TABLE II

| | | | Ketoxime Blocked Isocyanates + Amine Terminated Epoxies | | | | | | | |
|---|---|---|---|---|---|---|---|---|---|---|
| Soln. | Blocked NCO | | Amine Terminated Epoxy | | MEK Rubs | | | Reverse Impact | | |
| No. | Type | g | Type | g | 275° F. | 300° F. | 325° F. | 275° F. | 300° F. | 325° F. |
| 1 | Ex. 3 | 17.0$^a$ | Prepared in Ex. 2-A | 18.3 | >100 | N.D.$^c$ | >100 | F40 | N.D. | F40 |
| 2 | Ex. 3 | 17.0$^a$ | Prepared in Ex. 1 | 34.7 | >100 | N.D. | >100 | F40 | N.D. | F40 |
| 3 | Ex. 3 | 17.0$^a$ | Prepared in Ex. 2-B | 17.0 | >100 | N.D. | >100 | F40 | N.D. | F40 |
| 4 | Ex. 3 | 17.0$^a$ | Prepared in Ex. 2-C | 27.7 | >100 | N.D. | >100 | F40 | N.D. | F40 |
| 5 | Ex. 4 | 17.0$^a$ | Prepared in Ex. 2-A | 18.3 | >100 | N.D. | >100 | F120 | N.D. | F120 |
| 6 | Ex. 4 | 17.0$^a$ | Prepared in Ex. 1 | 34.7 | >100 | N.D. | >100 | F40 | N.D. | F40 |
| 7 | Ex. 4 | 17.0$^a$ | Prepared in Ex. 2-B | 17.0 | >100 | N.D. | >100 | P140 | N.D. | F60 |
| 8 | Ex. 4 | 17.0$^a$ | Prepared in Ex. 2-C | 27.7 | >100 | N.D. | >100 | P140 | N.D. | P140 |
| 9 | Ex. 4 | 55.8$^b$ | Prepared in Ex. 2-D | 13.8 | N.D. | >200 | N.D. | N.D. | P160 | N.D. |
| 10 | Ex. 4 | 55.8$^b$ | Prepared in Ex. 2-E | 6.7 | N.D. | 47 | N.D. | N.D. | P160 | N.D. |
| 11 | Ex. 4 | 55.8$^b$ | Prepared in Ex. 2-F | 5.8 | N.D. | 69 | N.D. | N.D. | P160 | N.D. |

$^a$0.03 equivalents
$^b$0.1 equivalents
$^c$N.D. = not determined

EXAMPLE 7

The method of Example 1 was repeated using 170 g (0.966 equiv.) of D.E.R. 736 (a diglycidyl ether of dipropylene glycol having an equivalent weight of 176 from The Dow Chemical Company) dissolved in 73 g of 2-methoxypropanol and 114.4 g (1.11 mole) of diethylene triamine dissolved in 49 g of 2-methoxypropanol. The product was a nearly colorless, fluid liquid having a Gardner viscosity of M-N (about 330 cps.) at 24° C.

We claim:

1. A composition which is curable at temperatures above about 120° C. consisting essentially of
(A) an adduct of
   (1) an epoxy resin having an average of more than one epoxy group per molecule and an average epoxide equivalent weight of from about 140 to about 1000 and
   (2) a polyamine compound having at least two amine groups selected from primary amine groups, secondary amine groups or mixture of such groups per molecule;
(B)
   (1) a material containing an average of more than one NCO group per molecule which NCO groups have been substantially fully blocked with
   (2) ketoximes, aldoximes, lactams, N-hydroxy-imides or alcohols; and optionally
(C) any one or more of fillers, pigments, dyes, flow control agents or solvents;
and wherein
(a) components (A-1) and (A-2) are employed in quantities which provide from about 0.9 to about 20, moles of polyamine compound per epoxide equivalent; and
(b) components (A) and (B) are employed in quantities which provide a ratio of latent NCO groups in component (B) per primary and/or secondary amine group in component (A) of from about 0.75:1 to about 2:1.

2. A composition of claim 1 wherein
(a) components (A-1) and (A-2) are employed in quantities which provide from about 0.9 to about 10 moles of polyamine compound per epoxide equivalent; and
(b) components (A) and (B) are employed in quantities which provide a ratio of latent NCO groups in component (B) per primary and/or secondary amine group in component (A) of from about 0.9:1 to about 1.5:1.

3. A composition of claim 2 wherein
(a) components (A-1) and (A-2) are employed in quantities which provide from about 0.9 to about 2 moles of polyamine compound per epoxide equivalent; and
(b) component (A-1) is a diglycidyl ether of a polyhydric phenol;
(c) component (B-1) is toluene diisocyanate or a prepolymer thereof; and
(d) component (B-2) is a ketoxime or an aldoxime.

4. A composition of claim 2 wherein
(a) component (A-1) is a diglycidyl ether of a polyhydric phenol;
(b) component (B-1) is toluene diisocyanate or a prepolymer thereof; and
(c) component (B-2) is ε-caprolactam.

5. A composition of claim 3 wherein
(a) component (A-1) is a diglycidyl ether of bisphenol A;
(b) component (A-2) is ethylenediamine, 2-aminoethylpiperazine, diethylenetriamine or mixture thereof; and
(c) component (B-2) is methyl ethyl ketoxime.

6. A composition of claim 2 wherein
(a) component (A-1) is a diglycidyl ether of a material having two aliphatic hydroxyl groups per molecule;
(b) component (B-1) is toluene diisocyanate or a prepolymer thereof; and
(c) component (B-2) is a ketoxime or an aldoxime.

7. A composition of claim 2 wherein
(a) component (A-1) is a diglycidyl ether of a material having two aliphatic hydroxyl groups per molecule;
(b) component (A-2) is ethylenediamine, 2-aminoethylpiperazine, diethylenetriamine or mixture thereof; and
(c) component (B-2) is ε-caprolactam.

8. A composition which comprises
(1) from about 90 to about 40 percent by weight of a composition of claim 1 and
(2) from about 10 to about 60 percent by weight of a suitable solvent system therefor selected from ketones, glycol ethers, esters, and aromatic hydrocarbons, or mixture thereof.

9. A composition of claim 8 wherein component (1) is present in quantities of from about 50 to about 85 percent by weight and component (2) is present in quantities of from about 15 to about 50 percent by weight.

10. A composition of claim 9 wherein component (2) comprises methyl ethyl ketone, 2-methoxypropanol or mixture thereof.

11. (Amended) A composition *which comprises*
  (1) from about 40 to about 90 percent by weight of a composition of Claim 2 and
  (2) from about 10 to about 60 percent by weight of a suitable solvent system therefor selected from ketones, glycol ethers, esters, and aromatic hdyrocarbons, or mixture thereof.

12. A composition of claim 11 wherein component (1) is present in quantities of from about 40 to about 85 percent by weight and component (2) is present in quantities of from about 15 to about 60 percent by weight.

13. A composition of claim 12 wherein component (2) comprises methyl ethyl ketone, 2-methoxypropanol or mixture thereof.

14. (Amended) a composition *which comprises*
  (1) from about 40 to about 90 percent by weight of a composition of Claim 3 and
  (2) from about 10 to about 60 percent by weight of a suitable solvent system therefor selected from ketones, glycol ethers, esters, and aromatic hdyrocarbons, or mixture thereof.

15. A composition of claim 14 wherein component (1) is present in quantities of from about 40 to about 85 percent by weight and component (2) is present in quantities of from about 15 to about 60 percent by weight.

16. A composition of claim 15 wherein component (2) comprises methyl ethyl ketone, 2-methoxypropanol or mixture thereof.

17. (Amended) A composition *which comprises*
  (1) from about 40 to about 90 percent by weight of a composition of Claim 5 and
  (2) from about 10 to about 60 percent by weight of a suitable solvent system therefor selected from ketones, glycol ethers, esters, and aromatic hdyrocarbons, or mixture thereof.

18. A composition of claim 17 wherein component (1) is present in quantities of from about 50 to about 85 percent by weight and component (2) is present in quantities of from about 15 to about 50 percent by weight.

19. A composition of claim 18 wherein component (2) comprises methyl ethyl ketone, 2-methoxypropanol or mixture thereof.

20. The product resulting from curing a composition of claim 1.

21. The product resulting from curing a composition of claim 2.

22. The product resulting from curing a composition of claim 3.

23. The product resulting from curing a composition of claim 4.

24. The product resulting from curing a composition of claim 5.

25. The product resulting from curing a composition of claim 6.

26. The product resulting from curing a composition of claim 7.

27. The product resulting from curing a composition of claim 8.

28. The product resulting from curing a composition of claim 9.

29. The product resulting from curing a composition of claim 10.

30. The product resulting from curing a composition of claim 11.

31. The product resulting from curing a composition of claim 12.

32. The product resulting from curing a composition of claim 13.

33. The product resulting from curing a composition of claim 14.

34. The product resulting from curing a composition of claim 15.

35. The product resulting from curing a composition of claim 16.

36. The product resulting from curing a composition of claim 17.

37. The product resulting from curing a composition of claim 18.

38. The product resulting from curing a composition of claim 19.

* * * * *